United States Patent Office 3,574,527
Patented Apr. 13, 1971

3,574,527
PROCESS FOR THE DYEING OF FIBRE MATERIALS OF POLYACRYLONITRILE OR COPOLYMERS CONTAINING ACRYLONITRILE
Klaus Walz, Leverkusen-Wiesdorf, Walter Hees, Cologne-Hoehenberg, and Mathieu Ouaedvlieg, Opladen, Germany, assignors to Farbenfabriken Bayer Aktiengesellschaft
No Drawing. Filed July 25, 1968, Ser. No. 747,451
Claims priority, application Germany, Aug. 4, 1967,
F 53,146
Int. Cl. D06p 5/06
U.S. Cl. 8—172                                3 Claims

ABSTRACT OF THE DISCLOSURE

Process for dyeing fibers containing at least 80% by weight polyacrylonitrile with cationic dyestuffs in level and deep shades by using as dyeing auxiliaries a guanidine compound of the formula

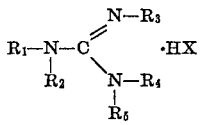

where the R's and X are as defined hereinbelow.

---

The present invention relates to a process for dyeing fibre materials made of polyacrylonitrile or copolymers containing acrylonitrile, with cationic dyestuffs. More particularly it concerns a process wherein the dyeing is carried out in the presence of guanidine compounds of the formula

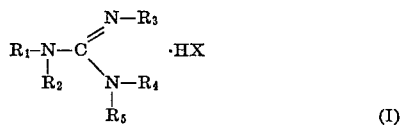
(I)

in which $R_1$ denotes hydrogen, an optionally substituted alkyl, cycloalkyl, aralkyl or aryl group or an optionally substituted acyl radical; $R_2$ and $R_3$, independently of one another, denote hydrogen or an optionally substituted alkyl, cycloalkyl, aralkyl or aryl group; $R_4$ stands for hydrogen, an optionally substituted alkyl, cycloalkyl, aralkyl or aryl group, or together with $R_2$ or $R_3$, forms a heterocyclic 5- or 6-membered ring; $R_5$ is hydrogen, an alkyl, cycloalkyl, aralkyl or aryl group, the grouping

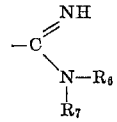

wherein $R_6$ and $R_7$, independently of one another, stand for hydrogen, aralkyl or aryl, or, if $R_1$ is hydrogen or an optionally substituted alkyl, cycloalkyl, aralkyl or aryl group, denotes —CN; and HX is an acid.

Acids HX are for example inorganic acids, as sulfuric acid, hydrochloric acid and hydrobromic acid, furthermore organic acids, as formic acid or acetic acid.

The alkyl groups primarily comprise those with 1 to 10 carbon atoms, for example, methyl, ethyl, propyl, isopropyl, butyl, n-hexyl, n-octyl, 2-ethylhexyl and decyl groups; the cycloalkyl groups primarily comprise cyclohexyl, tetrahydro- and decahydro-naphthalene groups; the aralkyl groups are primarily benzyl and phenyl ethyl groups; the aryl groups are primarily phenyl and naphthyl groups.

Examples of acyl radicals are the acetyl, hexanoyl, octanoyl, benzoyl, N-alkylcarbamoyl, N-arylcarbamoyl, N-alkylthiocarbamoyl and the phenylsulphonyl radicals.

Substituents for the alkyl groups are mainly phenoxy, phenylmercapto and acylamino radicals, for the cycloalkyl and aralkyl groups mainly $C_1$–$C_4$-alkyl radicals and halogen; suitable substituents for the aryl radicals are mainly $C_1$–$C_4$-alkyl radicals, halogen and hydroxyl groups.

The guanidine compounds of the Formula (I) to be used according to the invention can be obtained in various ways, for example, by the reaction of amines with cyanamides, by desulphurization of thioureas with amines, by the reaction of amine salts with dicyano-diamide or dicyanamide salts, or by the reaction of guanidine compounds of the formula $$R'-R''N-C\overset{\displaystyle NR'''}{\underset{\displaystyle NH_2}{}}$$

in which R' denotes hydrogen, alkyl or aryl, and R'' and R''' are hydrogen or alkyl, with cyanamide derivatives (refer to Houben-Weyl, "Methoden der organischem Chemie," vol. VIII (1952), pp. 180–188 and pp. 210–218).

As representatives of the guanidine compounds to be used for the process according to the invention, are mentioned for example the compounds of Formula (I) wherein HX denotes hydrochloric acid or sulfuric acid and wherein $R_1$, $R_2$, $R_3$, $R_4$ and $R_5$ have the following meaning:

| $R_1$ | $R_2$ | $R_3$ | $R_4$ | $R_5$ |
|---|---|---|---|---|
| n-$C_4H_9$ | H | H | n-$C_3H_7$ | H |
| n-$C_4H_9$ | n-$C_4H_9$ | H | H | H |
| n-$C_4H_9$ | H | H | n-$C_4H_9$ | H |
| n-$C_4H_9$ | n-$C_4H_9$ | H | H | 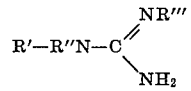 |
| n-$C_5H_{11}$ | H | H | H | H |
| n-$C_5H_{11}$ | H | H | $CH_3$ | $CH_3$ |
| n-$C_6H_{13}$ | H | H | H | H |
| n-$C_6H_{13}$ | H | H | $CH_3$ | $CH_3$ |
| n-$C_6H_{13}$ | H | H | H | $-C\overset{NH}{\underset{NH_2}{}}$ |
| n-$C_8H_{17}$ | H | H | H | H |

| R₁ | R₂ | R₃ | R₄ | R₅ |
|---|---|---|---|---|
| C₄H₉—CH—CH₂—<br>    \|<br>    C₂H₅ | H | H | H | H |
| Same as above | H | H | H | —C(=NH)NH₂ |
| C₄H₉—CH—CH₂—<br>    \|<br>    C₂H₅ | H | H | CH₃ | CH₃ |
| n-C₁₀H₂₁ | H | H | H | —C(=NH)NH₂ |
| C₇H₁₅—C(=O)—NH—CH₂—CH₂— | H | H | H | H |
| C₆H₅—O—CH₂—CH₂— | H | H | H | H |
| Same as above | H | H | H | —C(=NH)NH₂ |
| C₆H₅—S—CH₂—CH₂— | H | H | H | H |
| C₆H₅— | H | H | H | H |
| Same as above | H | H | H | C₂H₅ |
| Do | H | H | H | —C(=NH)NH₂ |
| Do | CH₃ | H | H | Same. |
| Do | C₂H₅ | H | H | H |
| C₆H₅—CH₂— | H | H | H | H |
| Same as above | H | H | CH₃ | CH₃ |
| Do | H | H | H | —C(=NH)NH₂ |
| C₆H₅—CH₂—CH₂— | H | H | H | H |
| Same as above | H | H | H | —C(=NH)NH₂ |
| C₆H₅— (cyclohexyl/phenyl) | H | H | H | H |
| Same as above | H | H | C₂H₅ | C₂H₅ |
| Do | H | CH₃ | CH₃ | CH₃ |
| Do | CH₃ | H | H | H |
| Do | C₂H₅ | H | H | —C(=NH)NH₂ |
| CH₃—C₆H₄— | H | H | H | H |
| Same as above | H | H | H | CH₃ |
| Do | H | H | H | —C≡N |
| Do | H | H | H | —C(=NH)NH₂ |
| Cl—C₆H₄— | H | H | H | Same. |
| HO—C₆H₄— | H | H | CH₃ | CH₃ |

| R₁ | R₂ | R₃ | R₄ | R₅ |
|---|---|---|---|---|
| $CH_3\text{-}C_6H_3(CH_3)\text{-}$ (2,x-dimethylphenyl) | H | H | H | $-C(=NH)NH_2$ |
| $CH_3-C(=O)-$ | H | H | $n\text{-}C_{16}H_{13}$ | H |
| Same as above | H | H | $-C_6H_{10}\text{-}H$ (cyclohexyl) | H |
| $C_5H_{11}-C(=O)-$ | H | H | $CH_3$ | $CH_3$ |
| $C_7H_{15}-C(=O)-$ | H | H | H | H |
| $C_6H_5-C(=O)-$ | H | H | H | H |
| Same as above | H | H | H | $-C(=NH)NH_2$ |
| Do. | H | H | $CH_3$ | $CH_3$ |
| $C_6H_5-NH-C(=O)-$ | H | H | H | H |
| $C_4H_9-CH(C_2H_5)-CH_2-NH-C(=O)-$ | H | H | H | $-C(=NH)NH_2$ |
| $C_4H_9-CH(C_2H_5)-CH_2NH-C(=S)-$ | H | H | H | Same. |
| $CH_3-C_6H_4-SO_2-$ | H | H | H | Do. |

Further suitable compounds are, for example, the hydrochlorides or sulfuric acid salts of the following guanidine compounds:

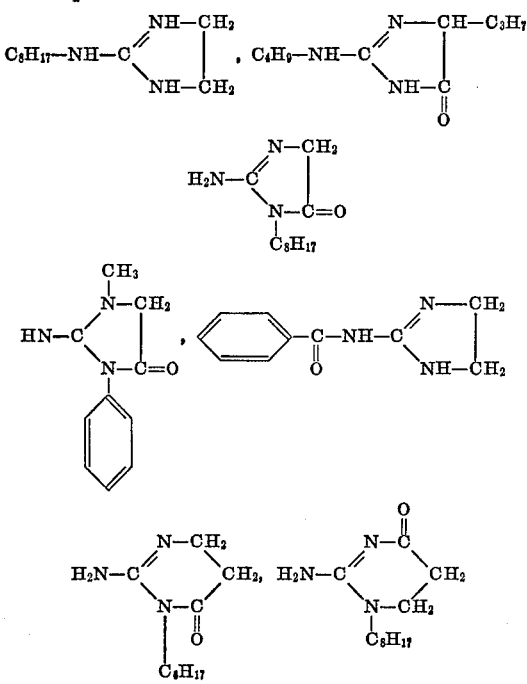

In cationic dyestuffs, there may be used dyestuffs from the most varied classes of compounds, for example, diphenylmethane, triphenylmethane and rhodamine dyestuffs; azo and anthraquinone dyestuffs containing onium groups; further oxazine, methine and azomethine dyestuffs, as are described, for example, in "American Dyestuff Reporter," (1954) pp. 432–433 in the U.S. patent specification 2,716,655 and in the British patent specifications 785,988 and 791,932.

The necessary amounts of the guanidine compounds of the Formula I to be used according to the invention can easily be ascertained by preliminary experiments. In general, amounts of about 1.5–3% of these compounds are used, referred to the weight of the material to be dyed.

Suitable copolymers containing acrylonitrile are, for example, those with vinyl chloride, vinylidene chloride, vinyl acetate, vinyl chloroacetate, vinyl alcohol, acrylic and methacrylic acid, acrylic and methacrylic acid esters, allyl chloroacetate or basic vinyl compounds, such as vinylimidazole, vinylbenzimidazole, vinylpyridine, vinylmethylpyrdine, vinylpyrimidine, provided the proportion of these co-monomers does not exceed 20% by weight.

Dyeing of the fibre materials of polyacrylonitrile can be carried out in the usual manner, by introducing the material to be dyed into an aqueous bath which has been heated to about 50–60° C. and contains a cationic dyestuff, guanidine compounds of the Formula I, added salts, such as sodium acetate or sodium sulphate, further acids, such as acetic acid or formic acid, by subsequently raising the temperature of the dyebath to approximately 100° C. in the course of about 30 minutes, and then holding the dyebath at the same temperature until it is exhausted. However, it is also possible to add the cationic dyestuff subsequently to the dyebath, for example, when the temperature of the bath has risen to about 60° C. Furthermore, it is possible to pretreat the material to be dyed at a temperature of 40–100° C. with a liquor containing the customary salts and acids but not yet the dyestuff, only then to add the dyestuff and to carry out the dyeing at 100° C. Finally, the dyeing material may also be introduced directly into the dyebath which has been heated to approximately 100° C. and contains guanidine compounds of the Formula I. The guanidine compounds may also be used in combination with basic compounds such as have hitherto been used as levelling auxiliaries in the dyeing of polyacrylonitrile fibres, for example, with quaternary ammonium salts containing higher alkyl radicals, such as cetyl-benzyldimethyl-ammonium chloride.

With the aid of the process according to the invention it is possible to dye the most varied fibre materials which consist of polyacrylonitrile or of copolymers containing acrylonitrile or which contain polymers or copolymers of this type, for example, cable sheathing, combed material, flocks, filaments, yarns, fabrics or knitted fabrics, in eminently level and deep shades.

The guanidine compounds to be used according to the invention further the migration of the cationic dyestuffs in the fibre, even without the addition of electrolytes such as sodium sulphate, without reducing the absorbing power of the fibres for the cationic dyestuffs to any noteworthy extent.

EXAMPLE 1

Yarns of polyacrylonitrile fibres are introduced in a liquor ratio of 1:40 into a bath which has been heated to 80° C. and which contains, per litre, 0.1 g. of the dyestuff 1-amino-4-(dimethylamino-methylanilido) - anthraquinone hydrochloride, 0.25 g. sodium acetate, 0.3 g. glacial acetic acid, and 0.7 g. of the compound of the formula

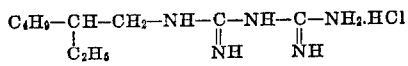

The bath is heated to 98° C. and kept at this temperature for 60 minutes. A level blue dyeing is obtained.

EXAMPLE 2

Yarns of polyacrylonitrile fibres are introduced in a liquor ratio of 1:40 into a bath which has been heated to 80° C. and contains, per litre, 0.2 g. of the dyestuff obtainable by quaternisation of 1-methylamino-4-(3'-dimethylaminopropylamino)-anthraquinone with dimethyl sulphate, 0.25 g. sodium acetate, 0.3 g. glacial acetic acid, and 0.6 g. of the compound of the formula

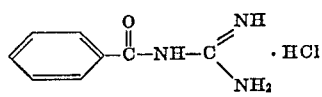

The bath is then heated to 98° C. and kept at this temperature for 60 minutes. A blue dyeing of excellent levelness is obtained.

EXAMPLE 3

Yarns of polyacrylonitrile fibres are introduced in a liquor ratio of 1:40 into a bath which has been heated to 80° C. and contains, per litre, 0.15 g. of the dyestuff obtainable by quaternisation of 1-(3'-dimethylaminopropylamino)-4-p-toluidine)-anthraquinone with dimethyl sulphate, 0.25 g. sodium acetate, 0.3 g. glacial acetic acid, 0.3 g. of the compound of the formula

and 0.3 g. of the compound of the formula

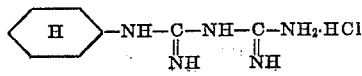

The bath is then heated to 98° C. and kept at this temperature for 60 minutes. A greenish blue dyeing of excellent levelness is obtained.

We claim:

1. In the process for dyeing fiber materials made of polyacrylonitrile or copolymers containing at least 80% by weight acrylonitrile with cationic dyestuffs, the improvement which comprises using as dyeing auxiliaries guanidine compounds of the formula

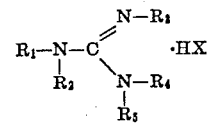

in which $R_1$ denotes hydrogen, an optionally substituted alkyl, cycloalkyl, aralkyl or aryl group or an optionally substituted acyl radical; $R_2$ and $R_3$, independently of one another, denote hydrogen or an optionally substituted alkyl, cycloalkyl, aralkyl or aryl group; $R_4$ stands for hydrogen, an optionally substituted alkyl, cycloalkyl, aralkyl or aryl group or, together with $R_2$ or $R_3$, forms a heterocyclic five- or six-membered ring; $R_5$ means hydrogen, an alkyl, cycloalkyl, aralkyl or aryl group, the grouping

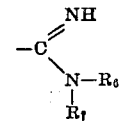

wherein $R_6$ and $R_7$, independently of one another, stand for hydrogen, aralkyl or aryl, or if $R_1$ is hydrogen or an optionally substituted alkyl, cycloalkyl, aralkyl or aryl group, denotes —CN; and HX is an acid, with the proviso that the sum of the carbon atoms altogether present in $R_1$, $R_2$, $R_3$, $R_4$ and $R_5$ is at least 5.

2. The process of claim 1 wherein guanidine compounds of the formula set forth in claim 1 are used wherein $R_1$, $R_2$, $R_3$, $R_4$ and HX have the meaning set forth in claim 1 and $R_5$ stands for the grouping $$-C\begin{matrix}\nearrow NH \\ \searrow NH_2\end{matrix}$$

with the proviso that the sum of the carbon atoms present in $R_1$, $R_2$, $R_3$ and $R_4$ is at least 6.

3. Fibre materials made of polyacrylonitrile or copolymers containing acrylonitrile dyed according to claim 1.

References Cited

UNITED STATES PATENTS

| | | | |
|---|---|---|---|
| 2,558,733 | 7/1951 | Cresswell et al. | 8—Acrylo |
| 3,098,690 | 7/1963 | Guion | 8—172X |
| 3,117,831 | 1/1964 | Mautner | 8—172X |

GEORGE F. LESMES, Primary Examiner

T. J. HERBERT, Jr., Assistant Examiner

U.S. Cl. X.R.

8—177AB